United States Patent [19]

Tramposch

[11] E Re. 29,792

[45] Reissued Oct. 3, 1978

[54] BATCH TICKET READER

[75] Inventor: Herbert Tramposch, Riverside, Conn.

[73] Assignee: Pitney-Bowes, Inc., Stamford, Conn.

[21] Appl. No.: 638,596

[22] Filed: Dec. 8, 1975

Related U.S. Patent Documents

Reissue of:

[64] Patent No.: 3,791,516
Issued: Feb. 12, 1974
Appl. No.: 216,536
Filed: Jan. 10, 1972

[51] Int. Cl.[2] ..... B07C 3/14

[52] U.S. Cl. ..... 209/583; 209/587; 250/223 R; 271/64

[58] Field of Search ..... 209/73, 74 R, 111.7 R; 271/DIG. 2, 64, 110, 111, 114; 250/223 R

[56] References Cited

U.S. PATENT DOCUMENTS

| | | | |
|---|---|---|---|
| 2,867,438 | 1/1959 | Hori | 271/96 X |
| 3,087,612 | 4/1963 | Duncan et al. | 209/74 R |
| 3,245,533 | 4/1966 | Rottmann | 209/111.7 |
| 3,343,672 | 9/1967 | De Vries et al. | 209/111.7 X |
| 3,355,980 | 12/1967 | Mathias | 209/111.7 R X |
| 3,446,351 | 5/1969 | Born | 209/111.7 R |
| 3,532,337 | 10/1970 | Kratz | 271/110 X |
| 3,545,742 | 12/1970 | Muller et al. | 271/258 X |
| 3,673,389 | 6/1972 | Kapsambelis et al. | 194/4 C X |
| 3,757,943 | 9/1973 | Chae et al. | 209/111.7 R |

*Primary Examiner*—Joseph J. Rolla
*Attorney, Agent, or Firm*—Peter Vrahotes; William D. Soltow, Jr.; Albert W. Scribner

[57] ABSTRACT

Ticket reading apparatus is disclosed having a moving grooved belt for transporting tickets fed singly thereto by separator rollers controlled by a clutch and brake in relation to information recording speed. Reading is accomplished by at least two detectors spaced to read information along the length of the ticket regardless of end-for-end orientation. Each detector comprises a light source and photocell detector having a narrow rhombic aperture for optimum reading of tickets oriented longitudinally on the belt or only slightly skewed. There is also provided a ticket routing gate assembly operated by a switch enabled by the information recorder to divert tickets to one of two routes and to stack tickets which have not been properly read.

14 Claims, 7 Drawing Figures

BATCH TICKET READER

Matter enclosed in heavy brackets [ ] appears in the original patent but forms no part of this reissue specification; matter printed in italics indicates the additions made by reissue.

BACKGROUND OF THE INVENTION

This invention relates to batch ticket reading apparatus and more particularly to such apparatus wherein information may be read from a ticket oriented in more than one position and wherein tickets which are properly read are separated from those which have not been properly read.

Sheet material processing apparatus for counting and printing, cutting or otherwise handling sheet material such as letters, bills, currency, tickets and the like have been known. Such machines, for example, may be of the general type disclosed in U.S. Pat. No. 2,378,250. Such machines generally operate by means of one or more separator feed rollers which pull single sheets from a stack of material, moves the sheets past a counting or imprinting station and then delivers the sheet material to a stack or bin. In the operation of such sheet handling apparatus the single sheet material whether it be a document, piece of currency or a ticket, generally pass one at a time past the counting or imprinting station.

While such sheet handling devices are capable of counting or imprinting tickets, for example, the function of machine reading of the ticket while it is being processed is desirable in the handling of sales tickets for retail merchandise. Such sales tickets may contain a substantial amount of information in coded machine readable form as well as alphanumeric and eye readable material. Thus it is desirable to have sheet material processing equipment which can singly process information-bearing sheets such as retail sales tickets and read and record the information relating to each sale represented by the ticket.

Problems arise however in the reading and sorting of tickets with respect to the location of the machine readable information on the ticket and the orientation of the ticket as it is stacked in the machine for processing. It is impractical to have sorting of retail sales tickets so that the machine readable code is oriented in the proper direction as the ticket is being processed. For example the ticket may be reversed end-for-end in the stack. Further, such tickets may be stacked upside down wherein the machine readable code faces away from the reading station as the ticket is being processed.

Accordingly it is an object of the present invention to provide a batch ticket reader which can reliably read information from sheet materials such as retail sales ticket.

Another object of the invention is to provide a batch ticket reader of the above character wherein the ticket may be read from more than one orientation as it is passed through the machine.

A further object of the invention is to provide a batch ticket reader of the above character which will reliably separate improperly read tickets from those which have been properly read.

A still further object of the invention is to provide a batch ticket reader of the above character which optionally reads information from the ticket.

Other objects of the invention will in part be obvious and will in part appear hereinafter.

The invention accordingly comprises the features of construction, combinations of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which.

SUMMARY OF THE INVENTION

The invention comprises the combination of a ticket reading station with ticket transport apparatus and the provision of a routing gate and control assembly for separating properly processed tickets from those which have not been properly processed. The reading station is provided with two or more detectors oriented to detect machine readable information in at least one of two positions as the ticket is moved past the reading station. The detectors preferably comprise light sources and photocell detectors for receiving reflected light from the ticket through a shaped aperture in the form of a narrow rhombus to provide for the reading of a ticket in a limited skewed position. The reading station further is provided with a preamplifier for each of the detectors for transmission of information to a recording and control unit. The routing gate and control assembly therefore comprises a grooved transport belt for carrying the ticket with the routing gate engaging the groove at the downstream end of the belt. The gate is operable by a switch interposed between the reading station and the gate and which is enabled by an on-off signal from the recording and control unit indicating whether or not the ticket has been properly read. Improperly read tickets will not actuate the gate and are routed to a stacking assembly for reinsertion into the ticket reader after the stack is turned upside down. Properly read tickets are routed to a bin.

DETAILED DESCRIPTION OF PREFERRED EMBODIMENT

Figure 1:
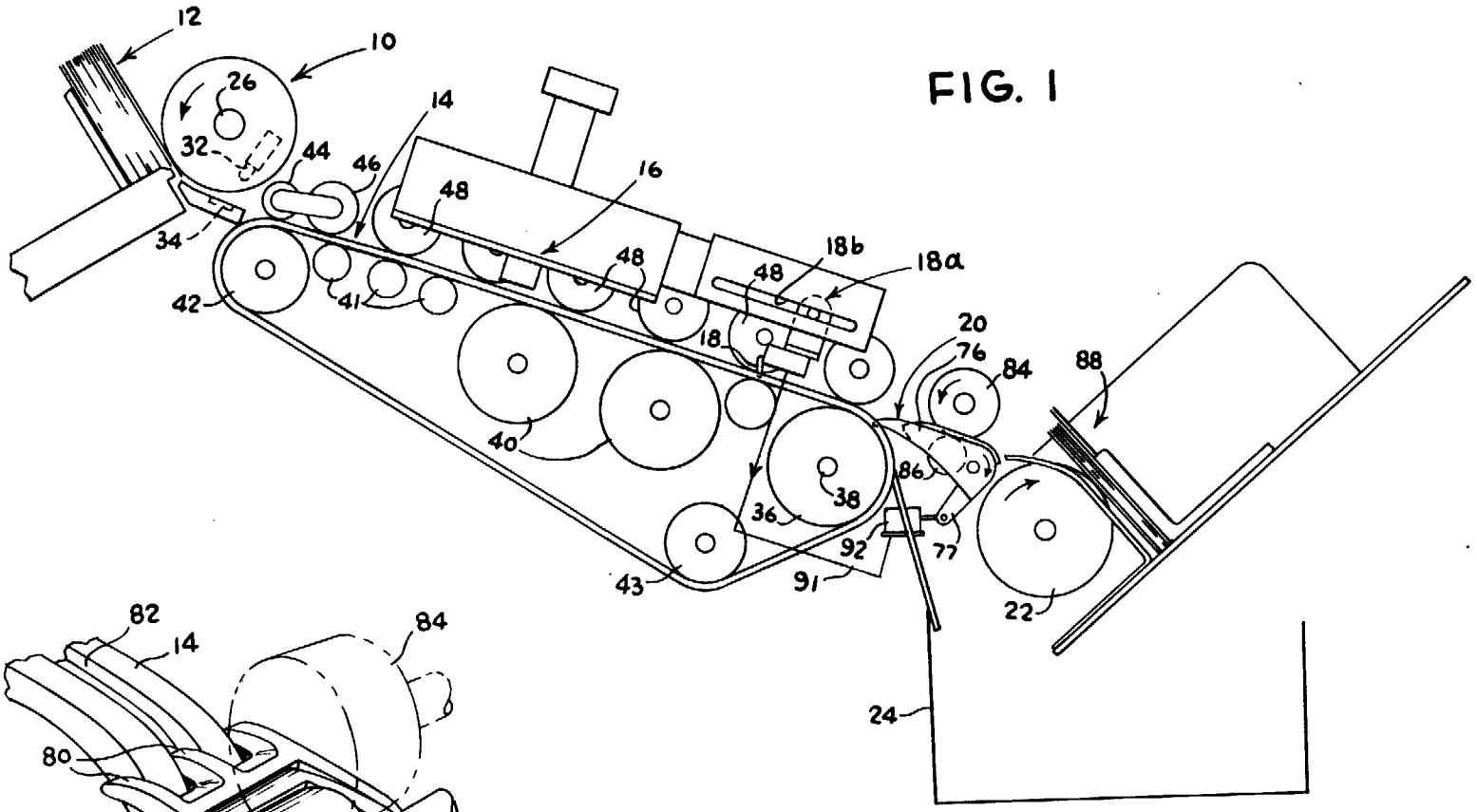
FIG. 1 is a side diagrammatic view of the ticket transport, reading and routing assemblies of the invention.

As shown in FIG. 1 the batch ticket reading apparatus of the invention comprises separator rollers 10 for feeding one ticket at a time from a stack 12 of tickets onto a grooved transport belt 14. Belt 14 moves the ticket to be read past the reading station 16 and then past routing switch 18 and to routing gate assembly 20. Routing gate 20 separates properly read tickets from those not properly read and routes the improperly read tickets for stacking by wheel 22 or into bin 24 for those that are properly read.

Figure 3:
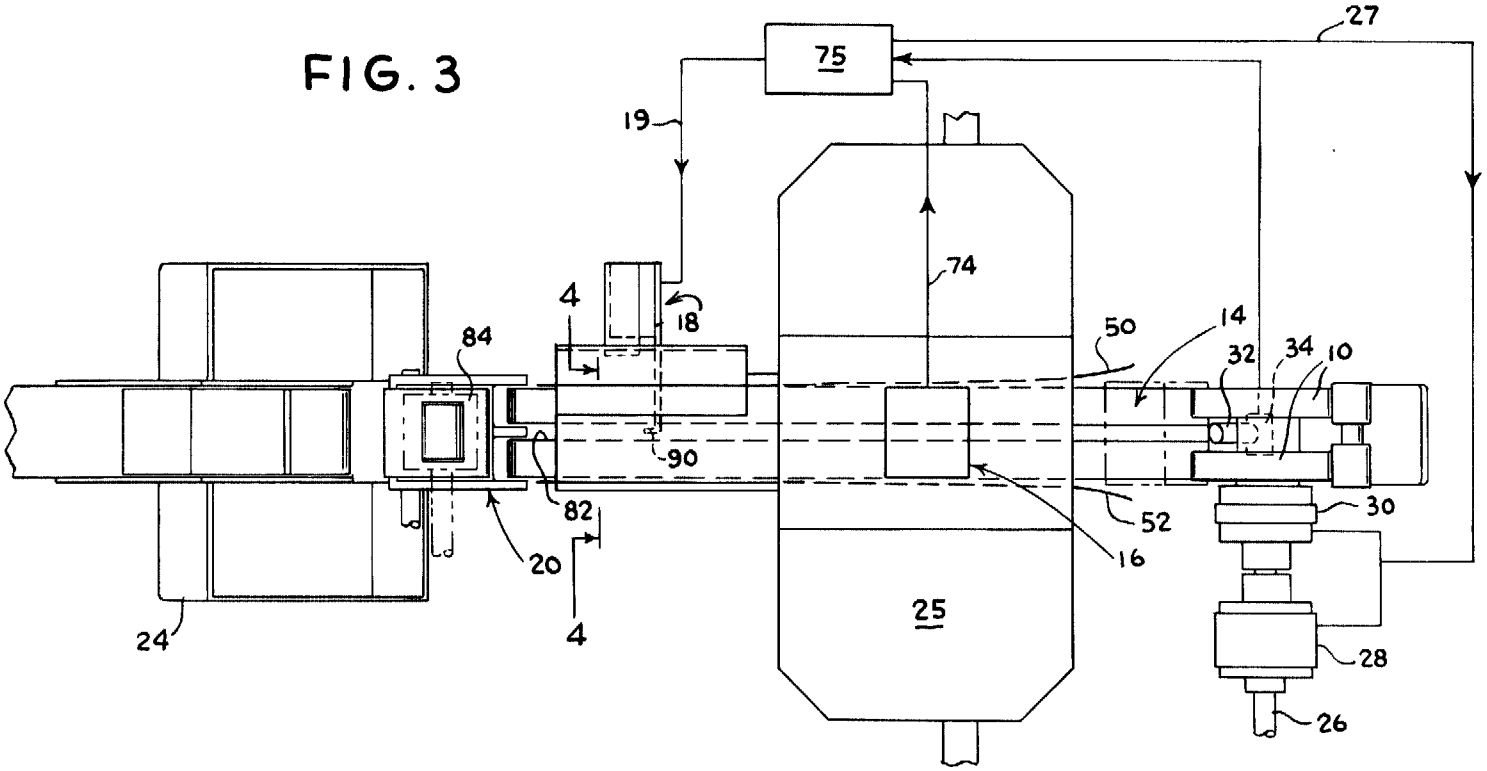
FIG. 3 is a top view of the ticket transport, reading and separation assembly of the invention.

As shown in FIG. 3 the separator rollers 10 are driven on a shaft 26 through a clutch 28 and brake 30. The clutch and brake assemblies permit single ticket feed by rotating the separator rollers 10 as required to feed one ticket onto belt 14. The clutch and brake assembly are operated by recording and control unit 75 in response to a signal from photocell detector 34. A light source 32 (FIG. 1) is cut off by a ticket as it is fed by the separator rollers 10. When the ticket has passed between light source 32 and detector 34, a signal is generated and electrically transmitted via electrical connection 31 to the recorder and control unit 75 and then via electrical connection 27 to stop the rotation of rollers 10. Actuation of the rollers 10 is again initiated by unit 75 through connection 27 to feed another ticket. Thus the feed rate is geared to the speed with which the recorder can handle information from the tickets. A light shield 25 is preferably provided around reading station 16.

The ticket transport belt 14 is driven by drive wheel 36 which is connected by its shaft 38 to a power source (not shown). Idler wheels 40, 41 support the belt top with the bottom portion of the belt passing under idler wheel 43 and around end wheel 42 as shown in FIG. 1. Guide rollers 44, 46 initially urge the ticket into contact with the belt 44 as the tickets are individually fed by the separator rollers 10. Idler wheels 48 over the path of ticket movement keep the tickets in frictional contact with the belt.

As best seen in FIG. 3, guideways 50, 52 urge and keep the tickets in approximate longitudinal orientation on the belt 14. Guideway 52 is fixed and is angled toward the belt 14 to urge the ticket into a more longitudinal configuration as it comes under the reading station 16.

Figure 5:
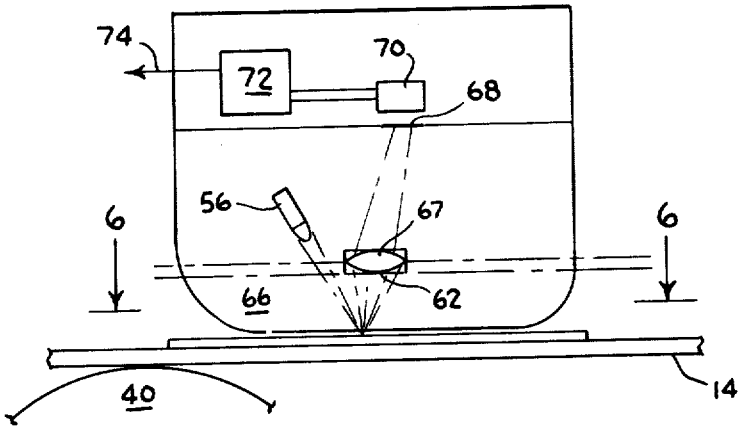
FIG. 5 is a partial diagrammatic vieew of the reading station, taken along lines 5—5 of FIG. 6.
Figure 7:
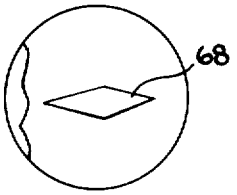
FIG. 7 is an enlarged partial view of the rhombic aperture through which reflected ticket information is read.
Figure 6:
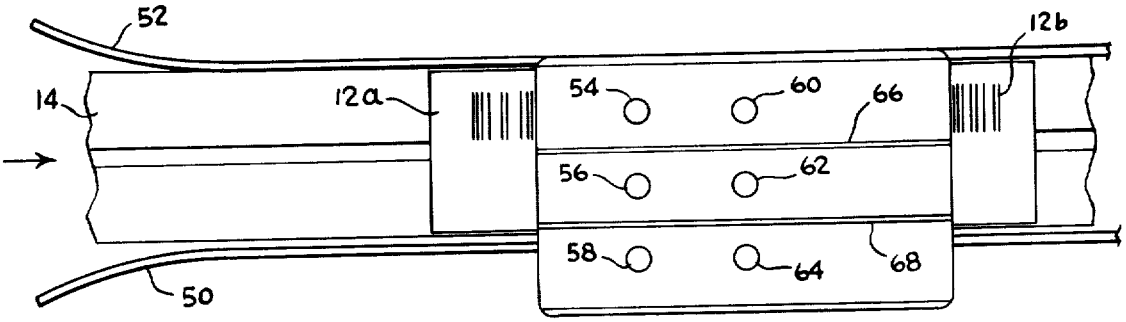
FIG. 6 is a sectional view taken along line 6—6 of FIG. 5.

Referring now to FIGS. 5 and 6 it will be seen that the reading station comprises three light sources 54, 56, 58 with associated apertures 60, 62, 64, picking up the reflected light from a ticket to be read. Each light source and pickup aperture is separated by a vertical divider 66, 66 and behind each aperture 60, 62, 64 there is a lens 67 as representatively shown in FIG. 5 for magnifying the light signal and focusing it through a rhombic aperture 68 to the photocell detector 70. The rhombic aperture will provide an optimum signal of straight or slightly skewed tickets as they are carried on the belt. As shown in FIG. 7, the rhombic aperture 68 is narrow across its short dimension and preferably about the width of a line on the bar code to be read. Thus the optimum signal from the bar code will be received by each detector whether the ticket is longitudinally straight on the belt or is slightly skewed.

Signals from the photocell pickup are then amplified by preamplifier 72 for transmission to recording and control unit 75 via electrical connection 74 (FIG. 3). Typically the retail sales ticket 12a is imprinted with a bar code 12b of lines and spaces containing the machine readable information. Thus as the ticket 12a is moved under the reading station with the bar code facing upwardly, the information thereon will be read through aperture 60 which is positioned over the bar code as it passes thereunder as shown in FIG. 6. If the ticket is turned end-for-end with the bar code facing upward the bar code will be read through aperture 62 since the ticket is guided by guides 50, 52 into reading registry with one or the other of the apertures 60, 62. The light source 58 and aperture 64 may be utilized for reading wider tickets in which case guide 50 would be moved further apart from guide 52 to accommodate such larger tickets.

In the event that the ticket is being fed under the reading station upside down, that is without the bar code being exposed to any of the reading apertures, the ticket will be routed for reprocessing. For those tickets which are properly read and the information thereof recorded, they will be routed past gate 20 and into bin 24.

Figure 2:
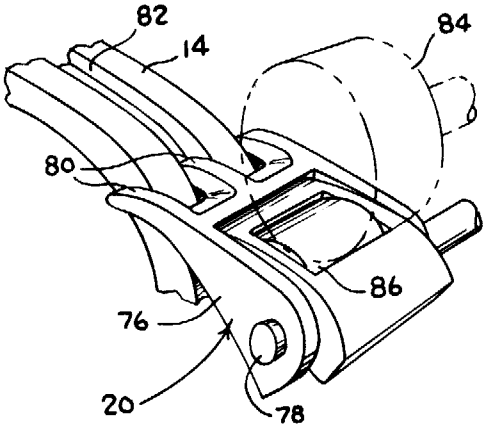
FIG. 2 is a partial perspective view of the routing gate assembly for separating tickets which have been properly and improperly processed.

Referring to FIGS. 1 and 2, the ticket routing gate assembly 20 comprises gate member 76 which pivots about shaft 78 and which has end extensions 80, the central one of which extends into groove 82 on belt 14. The groove 82 extends around the entire ticket carrying surface of the belt and provides a positive means for engagement of extension 80 with a ticket carried by the belt. Thus when member 76 is in the position shown in FIGS. 1 and 2 the ticket will be separated from the belt and pass between driven roller 84 and idler 86 and then will be stacked at 88 by driven stacking wheel 22. The stacked tickets will generally be those that have been fed to the reading station upside down, i.e., there was no readable indicia exposed to the detectors. Accordingly, the whole stack 88 may be reprocessed by turning them upside down and reinserting them into the ticket reader in a stack as at 12.

Figure 4:
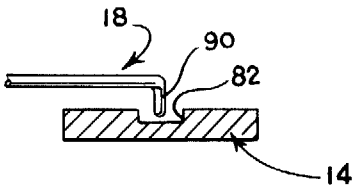
FIG. 4 is an enlarged partial view of the ticket routing switch.

If the ticket is properly read a signal is generated by the recorder and control unit 75 to enable switch 18 through electrical connection 19 (FIG. 3), the switch then being engaged by the read ticket. As shown in FIG. 4, switch 18 is provided with a depending arm 90 which extends into groove 82 of belt 14. Thus the passing of a ticket on belt 14 engages arm 90 to operate switch 18. If the switch has ben enabled by the ticket being properly read, solenoid 92 which is connected to the output of switch 18 through electrical connector 91, is operated to pivot member 76 through arm 77 away from the belt, thus permitting the ticket to pass thereunder and drop into bin 24. As best seen in FIG. 1, the switch 18 is carried on a mounting assembly 18a which can be variably positioned by screw means along slot 18b in relation to reading station 16 with respect to the speed of belt 14.

It should be understood that the term ticket as used in the specification and claims herein should not be considered as limiting, but includes sheet material having machine readable information thereon, such as a retail sales ticket.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. Batch ticket processing apparatus, comprising in combination:

A. a reading station having means for reading information encoded on tickets to be processed, *said reading station being provided with at least two light sources and two detectors in adjacent positions and laterally spaced apart relationship, each of said detectors being positioned along an axis normal to said path*

*to read ticket encoded information for each possible end-for-end orientation of a ticket, whereby ticket information may be read regardless of end-for-end ticket orientation;*

B. feed means for moving tickets singly in a path adjacent said reading station, 1. including guide means for substantially aligning the ticket before it passes said reading station;

C. recording and control means electrically connected to said reading means;

D. switch means positioned adjacent said feed path for actuation by a ticket, 1. said switch means spaced downstream from said reading station along said feed path,
2. said switch means being electrically connected to said recording and control means and selectively enabled thereby;

E. ticket routing gate means interposed in said feed path and spaced downstream from said switch means for diverting tickets to one of two routes, 1. said gate means being electrically energized through said switch means upon the coincidence of enablement by said recording and control means and actuation by a ticket, whereby a ticket is diverted to one of said two routes depending upon whether or not information is accurately read therefrom as determined and controlled by said recording and control means.

2. Ticket processing apparatus as defined in claim 1 wherein said reading station comprises at least two light sources and at least two photocell pickup devices for receiving reflected light from a ticket passing by said light sources, each photocell device being associated with one of the light sources, said light sources and their respective photocell devices being separated by a light shield member mounted on said reading station and closely spaced to said ticket path.

3. Ticket processing apparatus as defined in claim 1 wherein said reading station comprises at least one light source and photocell detector device as detector means for determining the configuration of light reflected from a ticket, including an aperture between the ticket and said photocell detector device, said aperture being of a rhombic configuration.

4. [Ticket processing apparatus as defined in claim 1 wherein said feed means comprises] *Batch ticket processing apparatus, comprising in combination:*

*A. a reading station having means for reading information encoded on tickets to be processed;*

*B. feed means for moving tickets singly in a path adjacent said reading station,*

*1. including guide means for substantially aligning the ticket before it passes said reading station;*

2. separator roller means for feeding tickets one at a time from a stack, said separator roller means being driven by a shaft having a clutch and brake assembly connected thereto, [and wherein there is provided]

*C. recording and control means electrically connected to said reading means;*

*D.* control means comprising a ticket detector adjacent said spearator roller means and electrically connected to said recording and control means to signal the beginning and end of a ticket, said clutch and brake assembly being electrically connected to and operable by said recording and control means in response to signals from said ticket detector;

*E. switch means positioned adjacent said feed path for actuation by a ticket,*

*1. said clutch means spaced downstream from said reading station along said feed path,*

*2. said switch means being electrically connected to said recording and control means and selectively enabled thereby;*

*F. ticket routing gate means interposed in said feed path and spaced downstream from said switch means for diverting tickets to one of two routes,*

*1. said gate means being electrically energized through said switch means upon the coincidence of enablement by said recording and control means and actuation by a ticket,*

*whereby a ticket is diverted to one of said routes depending upon whether or not information is accurately read therefrom as determined and controlled by said recording and control means.*

5. Ticket processing apparatus as defined in claim 1 wherein said feed means includes a ticket carrying belt having at least one groove in the direction of belt travel on the ticket carrying side thereof and said ticket routing gate means comprises a pivotable member having at least one extended portion normally positioned in said belt groove.

[6. Ticket processing apparatus as defined in claim 1 wherein said reading station is provided with at least two light sources and two detectors in adjacent positions and spaced apart in relation to information positioned on the tickets, each detector being adapted for separate detection of information, whereby ticket information may be read regardless of end-for-end ticket orientation.]

7. Ticket processing apparatus as defined in claim 1 wherein said ticket routing gate means comprises a pivotable ticket gate member normally held closely adjacent to the feed path of said feed means, solenoid means connected to said gate member for pivotably moving said gate member away from the feed path, said solenoid means being electrically connected to and operable by said switch means, and ticket stacking means adjacent said gate member for stacking tickets in the same orientation as the tickets were moved by said feed means.

8. Batch ticket processing apparatus comprising in combination:

A. a reading station having at least two detectors in adjacent relation for separate detection of information on tickets to be processed;

B. feed means for moving tickets singly in a path adjacent said reading station, including 1. a continuous moving belt having at least one groove in its ticket carrying surface in the direction of belt travel, and
2. guides along said belt to urge the tickets into a substantially longitudinal orientation on said belt;

C. recording and control means electrically connected to said reading station;

D. switch means having an actuator arm extending into said groove of said belt, 1. said switch means being spaced downstream from said reading station along said feed path, and
2. said switch means being electrically connected to and enabled by said recording and control means, and E. a ticket routing gate assembly interposed in said feed path and spaced downstream from said switch means for diverting tickets to one of two routes, comprising, 1. gate member having guide extensions,
   a. one of said guide extensions protruding into the groove of said belt,
2. a solenoid assembly connected to said gate member for moving said gate member toward and away from said belt,
   a. said solenoid being connected to and actuated by said switch means, whereby information on a ticket may be detected by either of said detectors regardless of its end-for-end orientation and said switch means is enabled by information recorded from the ticket at said recording and control means and said switch is operated by the ticket to actuate said gate solenoid assembly to route the ticket.

9. Ticket processing apparatus as defined in claim 8 wherein said reading station comprises at least two light sources and photocell detectors, said light sources and detectors being positioned to reflect light from the ticket and there are provided apertures through which the reflected light is passed to said detectors, said apertures being of a narrow rhombic configuration, the shortest transverse dimension thereof being about the width of bar information on the ticket to be read.

10. Ticket processing apparatus as defined in claim 9 wherein there is further provided a lens between the ticket and each detector for magnification of the reflected image from the ticket.

11. Ticket processing apparatus as defined in claim 8 wherein there is provided ticket stacking means adjacent said gate member, comprising rotating stacking wheel means for receiving tickets when said gate member is not moved away from said belt by said solenoid, and a ticket stack guideway whereby tickets not properly read at said reading station will be routed to and stacked by said stacking means.

12. Ticket processing apparatus as defined in claim 8 wherein said feed means includes a separator roller for initiating the single feeding of tickets onto said belt, said separator roller being driven through a brake and clutch assembly, said brake and clutch assembly being controlled by electrical connection to said recording and control means, whereby tickets are fed to said belt at a rate in response to the rate of information recorded by said recording and control means.

*13. Batch ticket processing apparatus, comprising in combination:*

*A. means for holding a stack of tickets to be read;*

*B. a first hopper for holding tickets which have been read;*

*C. a second hopper for receiving rejected tickets;*

*D. endless feed means for moving tickets singly along a path from the stack holding means to a selected one of the first and second hoppers, the endless feed means including;*

*1. guide means for guiding the tickets along the path, and*

*2. means for stacking rejected tickets in the second hopper;*

*E. a reading station having detectors disposed adjacent the path in laterally spaced relation, each of said detectors being positioned along an axis normal to the ticket path to read ticket encoded information for each possible end-for-end orientation of a ticket;*

*F. recording and control means electrically connected to said reading station; and*

*G. a ticket routing gate assembly including,*

*1. a gate member disposed downstream of the detectors but upstream of the stacking means and*

*2. said recording and control means effecting movement of the gate member to divert tickets into a selected one of the first and second hoppers;*

*whereby information on the tickets can be read by one of the detectors regardless of the end-to-end orientation of the tickets.*

*14. Batch ticket processing apparatus comprising in combination:*

*A. means for holding a stack of tickets to be read;*

*B. a first hopper for holding tickets which have been read;*

*C. a second hopper for receiving rejected tickets;*

*D. an endless feed means for moving tickets singly along a path from the stack holding means to a selected one of the first and second hoppers, the endless feed means including,*

*1. a groove extending in the direction of said path;*

*2. guide means for guiding the tickets along said path, and*

*3. means for stacking rejected tickets in the second hopper;*

*E. a reading station having detectors disposed adjacent the path in laterally spaced relation, each of said detectors being positioned along an axis normal to the ticket path to read ticket encoded information for each possible end-for-end orientation of a ticket;*

*F. recording and control means electrically connected to said reading station; and*

*G. a ticket routing gate assemby interposed in said path for diverting tickets to one of said hoppers comprising,*

*1. a gate member having a guide extension protruding into said groove of said endless feed means,*

*2. said recording and control means effecting movement of said gate member toward and away from said groove;*

*whereby information on tickets can be detected by one of said detectors regardless of the end-for-end orientation of the tickets.*

*15. Ticket processing apparatus as defined in claim 14 wherein said reading station comprises a plurality of light sources and a plurality of photocell detectors, said light sources and detectors being positioned to reflect light from the ticket and there are provided apertures through which the reflected light is passed to said detectors.*

* * * * *

UNITED STATES PATENT AND TRADEMARK OFFICE

CERTIFICATE OF CORRECTION

PATENT NO. : RE 29,792

DATED : October 3, 1978

INVENTOR(S) : Herbert Tramposch

It is certified that error appears in the above-identified patent and that said Letters Patent are hereby corrected as shown below:

Column 1, lines 67 and 68, change "optionally" to -- optically --.

Column 2, line 22, change "vieew" to -- view --.

Column 3, line 28, change "44" to -- 14 --.

Column 4, line 36, change "ben" to -- been --.

Column 8, line 43, change "assemby" to -- assembly --.

Signed and Sealed this

*Fifteenth* Day of *June 1982*

[SEAL]

*Attest:*

GERALD J. MOSSINGHOFF

*Attesting Officer*

*Commissioner of Patents and Trademarks*